(12) United States Patent
Estrada

(10) Patent No.: US 8,295,805 B2
(45) Date of Patent: Oct. 23, 2012

(54) REAL-TIME REPLENISHMENT WITH ELECTRONIC CONFIRMATION FOR SALE OF PREPAID LONG DISTANCE

(75) Inventor: Richard Estrada, Brandon, FL (US)

(73) Assignee: Krush Communications, LLC, Brandon, FL (US)

( * ) Notice: Subject to any disclaimer, the term of this patent is extended or adjusted under 35 U.S.C. 154(b) by 412 days.

(21) Appl. No.: 12/702,342

(22) Filed: Feb. 9, 2010

(65) Prior Publication Data

US 2010/0330956 A1     Dec. 30, 2010

Related U.S. Application Data

(60) Provisional application No. 61/248,965, filed on Oct. 6, 2009.

(51) Int. Cl.
| H04M 11/00 | (2006.01) |
| H04M 15/00 | (2006.01) |
| G06Q 20/00 | (2012.01) |
| G06Q 40/00 | (2012.01) |

(52) U.S. Cl. ............ 455/406; 705/69; 705/64; 705/39; 379/114.15; 379/114.16; 379/114.17; 379/114.18; 379/114.19; 379/114.21

(58) Field of Classification Search .................. 455/406; 705/69, 64, 39; 379/114.21, 114.15–114.19, 379/114.2

See application file for complete search history.

(56) References Cited

U.S. PATENT DOCUMENTS

| 2001/0007983 A1* | 7/2001 | Lee .................................. 705/69 |
| 2007/0179974 A1* | 8/2007 | Cai et al. ..................... 707/104.1 |
| 2007/0244752 A1* | 10/2007 | Bayne .............................. 705/14 |
| 2008/0219421 A1* | 9/2008 | Enriquez .................. 379/114.21 |
| 2009/0202054 A1* | 8/2009 | Wick .......................... 379/114.2 |

* cited by examiner

*Primary Examiner* — Jinsong Hu
*Assistant Examiner* — Opiribo Georgewill
(74) *Attorney, Agent, or Firm* — David F. Jacobs; Courtney Dunn; Smith & Hopen, P.A.

(57) ABSTRACT

A method and system of providing an electronic receipt, such as a SMS text message, to a consumer responsive to a purchase of long distance calling minutes, real-time replenishment of the customer's account, and seamless, pin-less use of the purchased long-distance from the user's chosen phone(s).

6 Claims, 4 Drawing Sheets

US 8,295,805 B2

REAL-TIME REPLENISHMENT WITH ELECTRONIC CONFIRMATION FOR SALE OF PREPAID LONG DISTANCE

CROSS REFERENCE TO RELATED APPLICATIONS

This application claims priority to currently pending U.S. Provisional Patent Application No. 61/248,965, entitled, "Electronic Receipts and Real-Time Replenishment for Prepaid Long Distance Calling", filed Oct. 6, 2009, which is hereby incorporated by reference.

FIELD OF INVENTION

The invention relates to real-time replenishment of prepaid long distance accounts with electronic confirmation sent in response to a purchase implemented from a web portal.

BACKGROUND

Calling cards were first invented in the mid 1970's in Europe as a way to pay for phone calls upfront allowing calls to be made from phone booths without using change. A calling card is a pre-paid card that allows a purchaser to purchase phone call minutes upfront and later redeem those minutes for use at a later time. Calling cards were first only available for making local calls. The cards were similar to a credit card in having a magnetic strip on the card which encoded the balance available on the calling card.

During the 1980's calling cards became available in the United States to make international phone calls. International calling cards enable a buyer to purchase a card with usage rates, which are country specific.

A SMS or short message service is a text message that is usually sent from one mobile handset to another. However, other mobile devices also support the SMS format as a communication tool. SMS text allows a person to send a short message to a recipient in a short amount of time. Recently, the usage of SMS has become wide spread as a communication tool.

Calling card technology has evolved from its early days of requiring a customer to purchase a calling card and use the card itself to use the calling card minutes purchased. However, calling card minutes could be easily completely lost if the physical card itself was lost.

SUMMARY

The present invention allows a customer to purchase long distance calling minutes without the need to physically take a calling card with the person to deem the minutes. The present invention includes a method and system of providing an electronic receipt to a consumer responsive to a purchase of long distance calling minutes, real-time replenishment of the customer's account, and seamless, pin-less use of the purchased long-distance from the user's chosen phone(s).

In an embodiment, the method of real-time replenishment with electronic confirmation in the sale of prepaid long distance includes receiving a phone number, a monetary amount, and an indication of whether the customer would like to add funds to their balance or receive a refund. The phone number is compared to a stored list of registered phone numbers. Each of the registered phone numbers in the list has a unique pin assigned to it. The customer's balance amount is also associated with the unique pin and the registered phone number. If the comparison found no matching registered numbers in the stored list and if the customer indicated that he would like to add funds to his balance, then a new pin is created (and associated with the phone number). If the customer indicated that he would like to add funds to his balance, then the balance amount for the account associated with phone number is increased by the monetary amount. If the customer indicated that he would like a refund, then the balance amount for the account associated with the phone number is decreased by the monetary amount. Then, a request having the phone number and a message to be sent to the phone number is sent to a server. The message sent to the phone number may include the access phone number, the monetary amount that was added or refunded, and/or the balance amount.

If the comparison found no matching registered numbers in the stored list and the customer indicated that he would like a refund then the method may further include displaying an error message. If the customer requests a refund and the refund results in the account balance being less than one cent, then the method may further include destroying the unique pin associated with the phone number.

In an embodiment, the system of real-time replenishment with electronic confirmation in the sale of prepaid long distance includes a web portal operable to perform the method described above. The system may further include a server operable to receive the request from the web portal having the phone number and a message to be sent to the phone number, parse the request into a SMS text message comprising the phone number and a message to be sent to the phone number, and send the SMS text message to the mobile phone associated with the phone number.

In an additional embodiment, the method of real-time replenishment with electronic confirmation in the sale of prepaid long distance includes receiving a text message having a pin. The text message will be associated with the phone number from which the text message was sent. The method further includes determining if the pin is valid, retrieving a monetary amount associated with the pin, responsive to a determination that the pin is valid, associating the monetary amount with the phone number, and sending a text receipt to the phone number. If it is determined that the pin is not valid, then the method may further include sending a text message indicating that the pin is invalid to the phone number.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
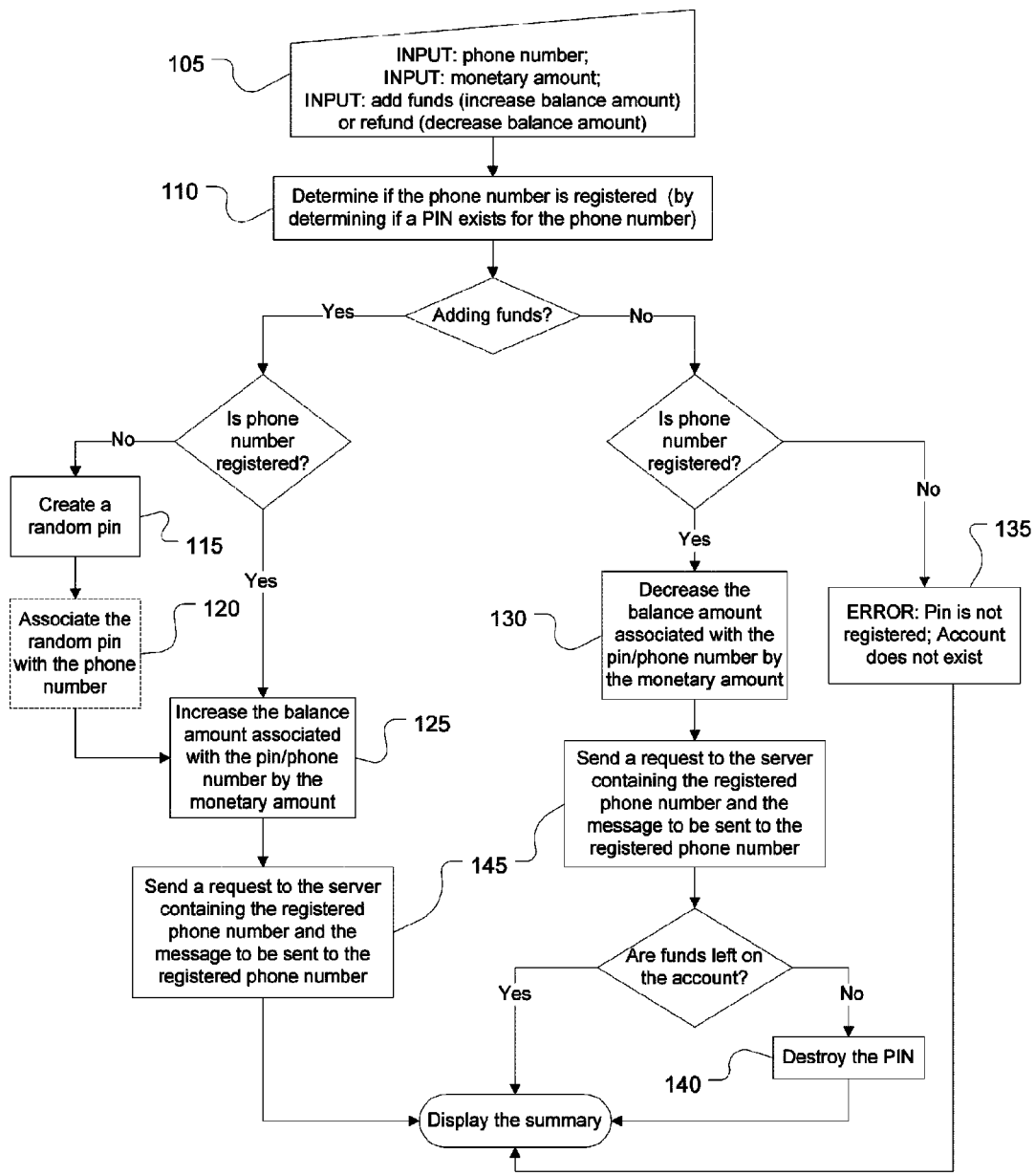
FIG. 1 is a flowchart of the method of real-time replenishment with electronic confirmation in the sale of prepaid long distance in accordance with an embodiment of the present in invention.

The present invention includes a method of real-time replenishment in the sale of prepaid long distance. After a transaction, including creation of a new account, adding funds to an existing account, or refunding all or a portion of an existing account, the customer's account will be updated in real-time, allowing the user to use the minutes just after purchasing them. The method, which is illustrated in the flowchart of FIG. 1, includes receiving a phone number, a monetary amount, and an indication of whether the customer would like to add funds to their balance or receive a refund (operation 105). The phone number is compared to a stored list of registered phone numbers (operation 110). Each of the registered phone numbers in the list has a unique pin assigned to it. The customer's balance amount is also associated with the unique pin and the registered phone number. If the comparison found no matching registered numbers in the stored list and if the customer indicated that he would like to add funds to his balance, then a new pin is created (operation 115) (and associated with the phone number (operation 120)). If the customer indicated that he would like to add funds to his balance, then the balance amount for the account associated with phone number is increased by the monetary amount (operation 125). If the customer indicated that he would like a refund, then the balance amount for the account associated with the phone number is decreased by the monetary amount (operation 130).

If the comparison found no matching registered numbers in the stored list and the customer indicated that he would like a refund, then an error message is displayed (operation 135). If the customer requests a refund and the refund results in the account balance being less than a predetermined amount, for example one cent, then the unique pin associated with the phone number is destroyed (operation 140).

The present invention also includes a method of providing a consumer with an electronic receipt of the consumer's transaction when they purchase or recharge prepaid long distance. The electronic receipts are a feature added to a website that provide the ability to send a virtual receipt of the customer's transaction. Prior to the present invention a clerk of a store selling the prepaid long distance was unequipped to provide the consumer with a receipt.

An electronic receipt, such as a SMS text message, is sent to a customer's cellular device to verify completion of transaction after a purchase or recharge of the prepaid long distance service. The electronic receipt contains detailed information on the amount the customer purchased or recharged and the access numbers for use of the service. This electronic receipt may be in one or more languages. The consumer may opt-out of receiving the electronic receipt.

In an implementation of the invention, a retail store takes and processes payment for the consumer. The retail store, in turn, sends payment to the provider of the prepaid long distance service. In another implementation, the website provides payment processing and the end user can order prepaid distance services directly using the website or a point of sale terminal, such as a kiosk located inside a retail store.

Figure 2:
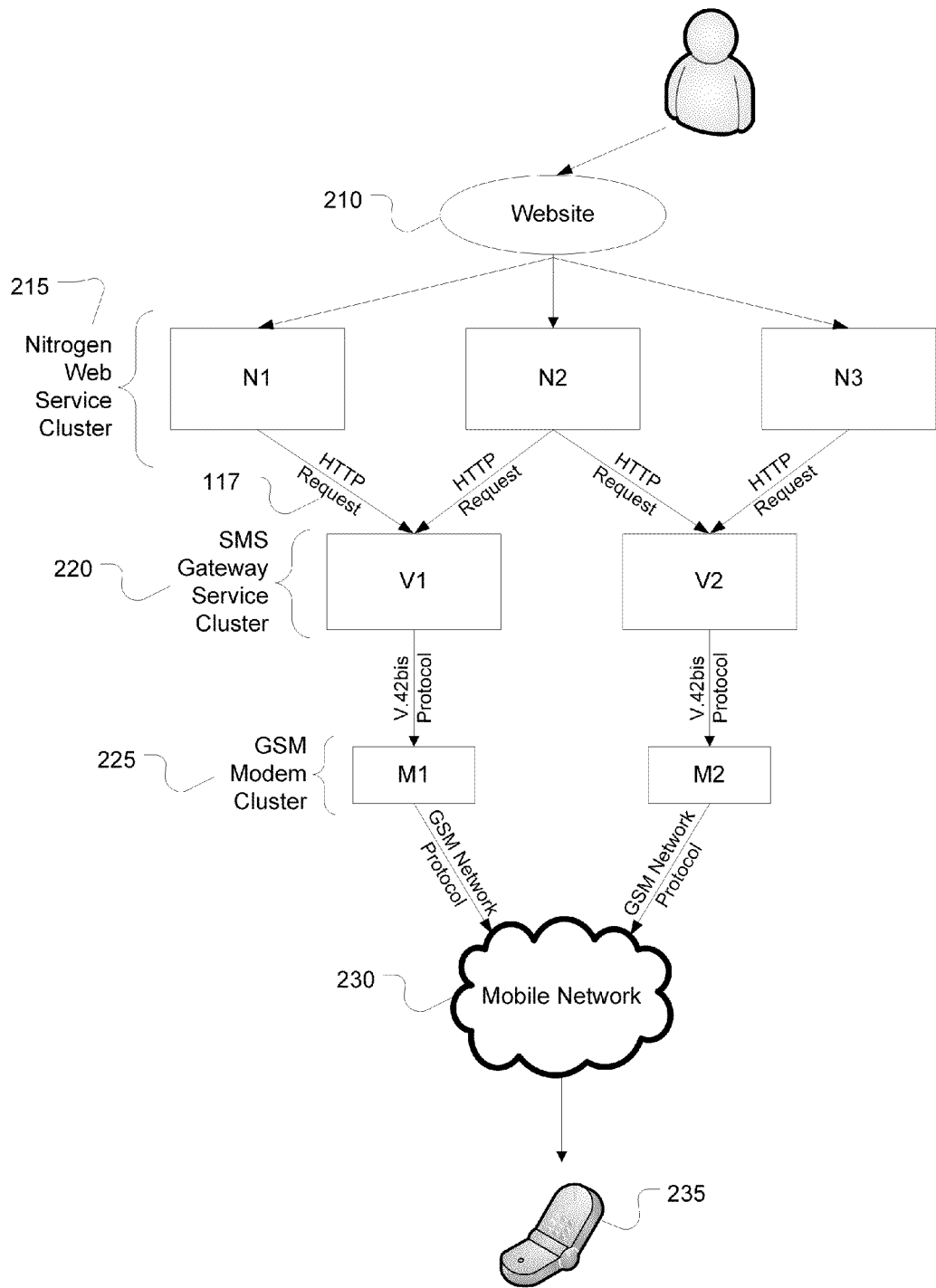
FIG. 2 is an exemplary block diagram of the functional interaction of the components used to provide SMS text receipts in accordance with an embodiment of the present in invention.

In an embodiment, the electronic receipts are SMS text messages that are requested by a web portal. The web portal is used by the consumer or another user, such as a convenience store clerk, to order long distance minutes or request a refund. An example of the functional interaction of the components used to provide SMS text receipts is shown in the block diagram of FIG. 2. In this example, website 210 builds a message that the user of registered device 235 will read upon receiving the text message. Website 210 then calls an API method defined under Nitrogen Web Services Framework 215 to send the text message (operation 145 of FIG. 1). The Nitrogen API method is written in PHP and builds HTTP request 217 that is sent to a server hosting SMS gateway service 220. HTTP request 217 includes the text to be displayed, the phone number to send the text message to, and an Internet Protocol (IP) Address of the server where SMS gateway service 220 runs. SMS gateway service 220 is provided by an open source Kannel software package. SMS gateway service 220 is the link between SMS mobile providers and the Content Provider (the server in which SMS gateway service 120 runs). SMS gateway service 220 handles connections with SMS mobile providers and relays them onward in a unified form. Once SMS gateway service 220 receives HTTP request 217 from the Nitrogen API method, it parses the request and sends the information to GSM Network 225 for SMS text message delivery through mobile network 230 to registered device 225.

The electronic receipt sent to the registered device may include any information pertinent to the transaction, including the monetary amount that was added to an account, the current balance of an account, and the access numbers that the customer must dial to use the service. Each electronic receipt may include the text in one or more languages.

Figure 3:
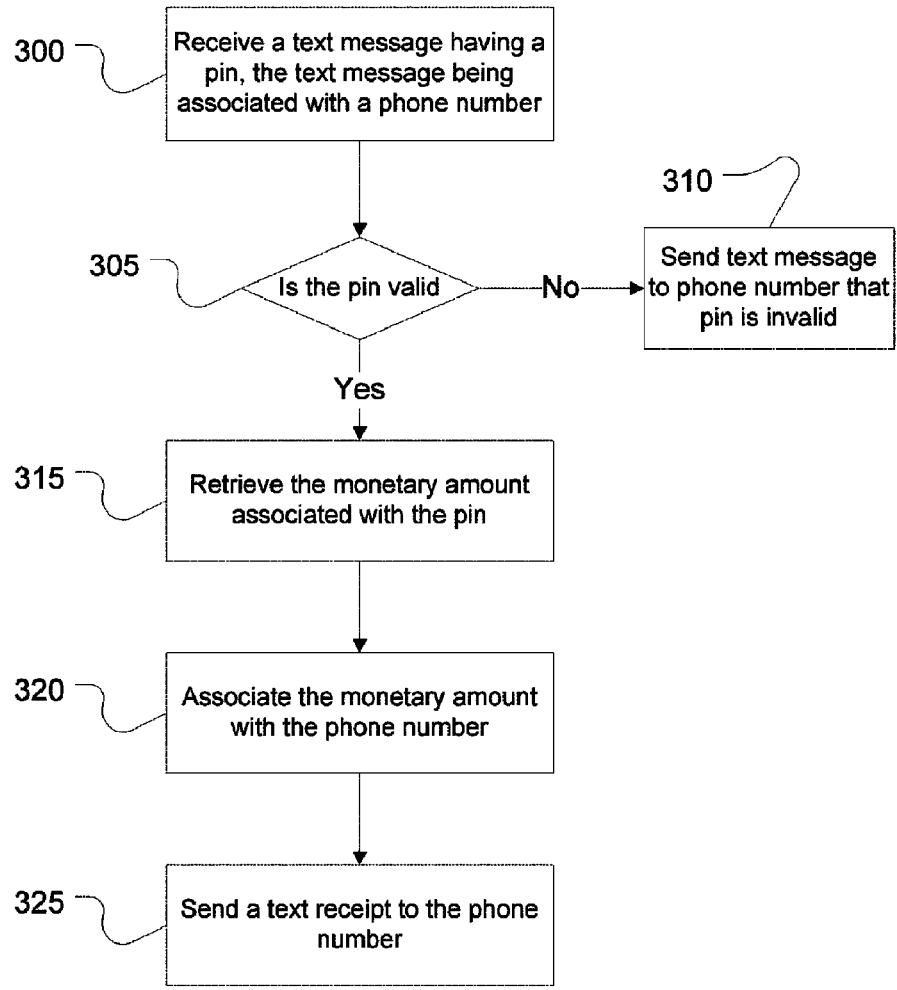
FIG. 3 is a flowchart of another method of real-time replenishment with electronic confirmation in the sale of prepaid long distance in accordance with an embodiment of the present in invention.

In another embodiment, illustrated in FIG. 3, a user may purchase prepaid long distance services and receive a pin. The pin may be a series of letters or numbers or a combination thereof. For example, pin may also be a in the form of a promotional code. The user then uses the phone that he wishes to register with the prepaid long distance service to send a text message containing the pin to a number designated by the prepaid long distance service provider. Upon receipt of the text message (operation 300), the pin is validated (operation 305) to ensure that the pin exists and has a monetary value associated with it (i.e. the pin has been paid for). If the pin is invalid, a text message is sent to the user's phone number notifying the user of the pin's invalidity (operation 310). If the pin is valid, the monetary amount associated with the pin is retrieved (operation 315) and associated with the phone number (operation 320). A text receipt is then sent to the phone number (operation 325).

Figure 4:
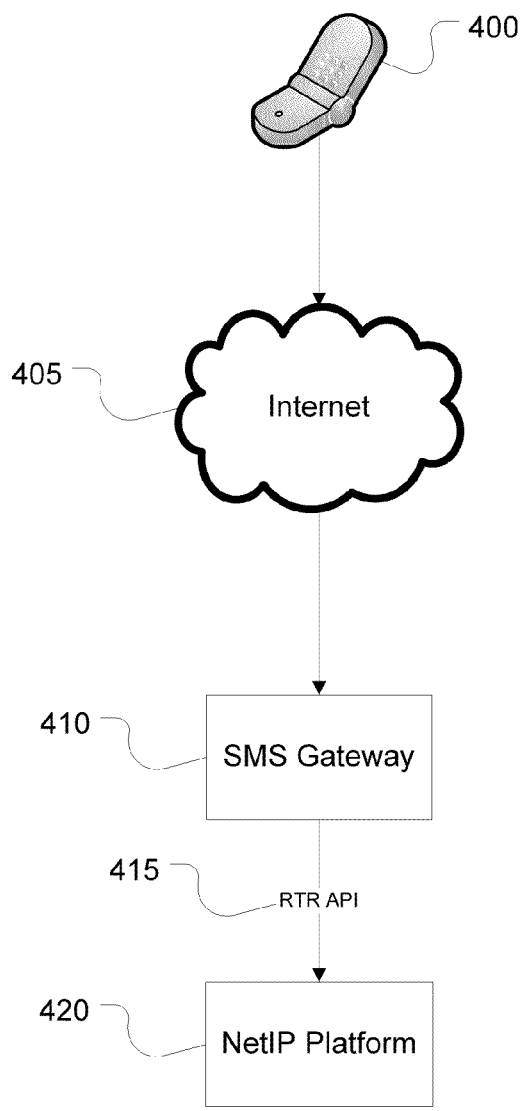
FIG. 4 is an exemplary block diagram of the functional interaction of the components used to receive and process a pin from a user and issue a SMS text receipt in accordance with an embodiment of the present in invention.

FIG. 4 shows an example of the functional interaction of the components used to receive and process a pin from a user and issue a SMS text receipt. In this example, a user uses phone 400 to text a pin to a designated phone number. The text message travels through internet 405 and is received at SMS Gateway 410. Real-time replenishment (RTR) API 415 determines the validity of the pin and the monetary amount associated with the pin, if any. RTR API 415 then communicates with NetIP Platform 420 and loads the user's phone number and the monetary amount. RTR API 415 then communicates with the SMS Gateway 410 to send a text receipt to the user.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of real-time replenishment with electronic confirmation in the sale of prepaid long distance, comprising:
   receiving a phone number to a computer-based server;
   receiving a monetary amount to the server;
   receiving to the server an indication of whether an increase or decrease to a balance amount is requested;
   comparing the phone number to a stored list of registered phone numbers, each registered phone number having a unique pin and a balance amount;
   wherein said pin is said phone number;
   creating a new pin, responsive to the comparison not resulting in a match and receiving the indication that an increase to the balance amount has been requested;
   increasing the balance amount by the monetary amount, responsive to receiving the indication that an increase to the balance amount has been requested;
   decreasing the balance amount by the monetary amount, responsive to receiving the indication that a decrease to the balance has been requested;
   indicating an error responsive to receiving the indication that a decrease to the balance has been requested and the comparison not resulting in a match and
   sending a request through the server, the request containing the phone number and a SMS message to be sent to the phone number;
   said SMS message containing an access phone number;
   wherein said access phone number is for use in the prepaid long distance.

2. The method of claim 1, further comprising:
   destroying the unique pin associated with the phone number responsive to receiving the indication that a decrease to the balance has been requested and the balance amount being less than one cent.

3. The method of claim 1, wherein the SMS message to be sent to the phone number further comprises the monetary amount.

4. The method of claim 1, wherein the SMS message to be sent to the phone number further comprises the balance amount.

5. A system for real-time replenishment with electronic confirmation in the sale of prepaid long distance, comprising:
   a web portal operable to:
      receive a phone number;
      receive a monetary amount;
      receive an indication of whether an increase or decrease to a balance amount is requested;
      compare the phone number to a stored list of registered phone numbers, each registered phone number having a unique pin and a balance amount;
      wherein said pin is said phone number;
      create a new pin, responsive to the comparison not resulting in a match and receiving the indication that an increase to the balance amount has been requested;
      increase the balance amount by the monetary amount, responsive to receiving the indication that an increase to the balance amount has been requested;
      decrease the balance amount by the monetary amount, responsive to receiving the indication that a decrease to the balance amount has been requested;
      indicating an error responsive to receiving the indication that a decrease to the balance has been requested and the comparison not resulting in a match and
      send a request to a server containing the phone number and a SMS message to be sent to the phone number;
      said SMS message containing an access phone number;
      wherein said access phone number is for use in the prepaid long distance.

6. The system of claim 5, wherein the server is operable to:
   receive the request from the web portal comprising the phone number and a message to be sent to the phone number,
   parse the request into a SMS text message comprising the phone number and the access number to be sent to the phone number, and
   send the SMS text message to the mobile phone associated with the phone number.

\* \* \* \* \*